July 24, 1956     N. J. SMITH     2,755,878
METHOD OF CREATING SEISMIC DISTURBANCES
Filed Sept. 21, 1954     2 Sheets-Sheet 1
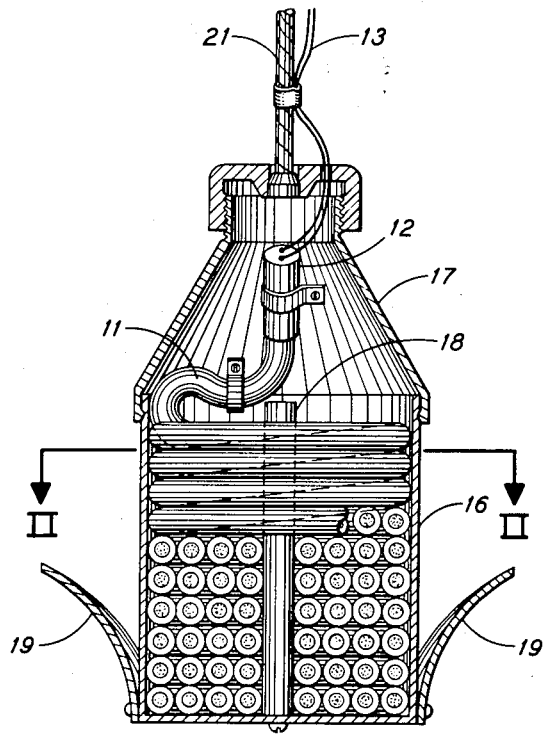
FIG. 1
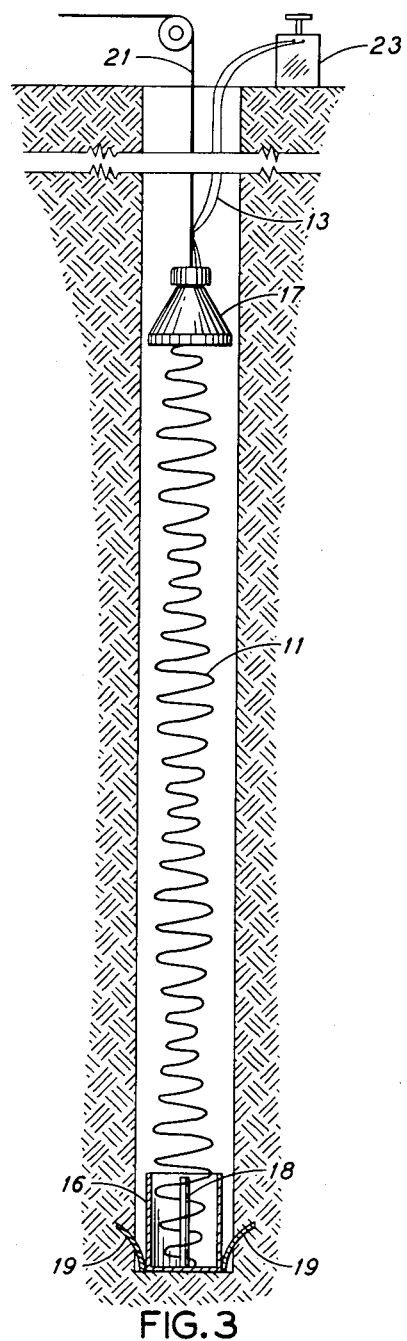
FIG. 2
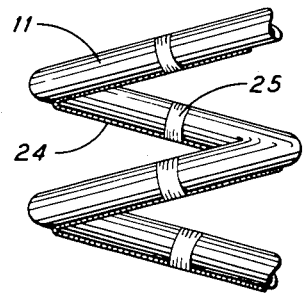
FIG. 4
FIG. 3
INVENTOR
NEAL J. SMITH
BY
ATTORNEYS July 24, 1956   N. J. SMITH   2,755,878
METHOD OF CREATING SEISMIC DISTURBANCES
Filed Sept. 21, 1954   2 Sheets-Sheet 2

INVENTOR
NEAL J. SMITH
BY
ATTORNEYS

United States Patent Office 2,755,878
Patented July 24, 1956

2,755,878

METHOD OF CREATING SEISMIC DISTURBANCES

Neal J. Smith, Houston, Tex., assignor, by mesne assignments, to California Research Corporation, San Francisco, Calif., a corporation of Delaware Application September 21, 1954, Serial No. 457,424

12 Claims. (Cl. 181—.5)

This invention relates in general to geophysical surveying by the seismic wave reflection method, and is directed more particularly to improved methods for generating artificial seismic waves for such surveying.

While the seismic method of geophysical prospecting on land prospects has been generally successful, there are areas of interest where the usefulness of the method is limited owing to the noise generated by the explosive used as the seismic wave source. This noise is usually of such character that it is picked up by the seismic detectors along with the desired waves, thus rendering recognition of the desired waves extremely difficult.

It has been proposed to use linear explosives in various forms in an effort to reduce the amount of objectionable noise generated by the seismic wave source. Such linear explosives may be used in various forms, such as spaced individual charges fired in certain sequences or a continuous length of linear explosive material which is progressively detonated. An additional solution proposed to overcome the noise-generation problem is to utilize a length of linear explosive material so arranged that the component of the detonation velocity in the direction of the vertical axis of the charge is equal to the seismic wave velocity in the surrounding medium. By thus matching the vertical detonation velocity component with the propagation velocity of the surrounding medium, maximum transfer of energy should occur between the explosive and the surrounding medium. One form of explosive utilized in the latter method is a length of linear explosive material wound in the form of a helix with the pitch of the helix adjusted to produce the desired vertical component of the detonation velocity. Such charges are usually formed by winding the material on a suitable member, such as a wooden pole, and then inserting the pole and explosive into the shot hole. However, this method has the disadvantages that it is a time consuming task to wind the explosives, and the loading of the poles into the shot holes is difficult, thus reducing the desirability of the method. Additionally, where wooden poles are utilized, the cost of this method is increased by the fact that a pole is destroyed for each charge.

Broadly, the present invention contemplates a method of conducting seismic exploration in which a length of linear explosive material is coiled or pre-formed into a compressed condition for insertion into the shot hole, and then the explosive material may be expanded to the desired shape or configuration. More particularly, the present invention contemplates coiling or stacking a linear explosive material in a compressed form occupying a minimum of space for insertion into the shot hole, and then the material is expanded to substantially or approximately helical form with the desired pitch between turns of the helix to produce the desired vertical detonation velocity component.

In accordance with the present invention, the linear explosive material is pre-formed or wound in such a shape so as to occupy a minimum volume for insertion in the shot hole. The material may be wound in the form of flat spirals stacked successively on each other so that when tension is applied to the upper end of the linear explosive material, the spirals are expanded into approximately a helical shape, the amount of pull on the upper end of the material determining the pitch of the resultant helix. Alternatively, the material may be wound in the form of flat, stacked spirals with some or all turns secured together by spacer cords whose length determines the amount of expansion between turns, thus determining the pitch of the resultant helix. The charges may be made up of a single package of the linear explosive material or may be composed of a series of connected packages having lengths of spacer cord secured therebetween to determine the space between the packages when in the expanded position.

It is therefore an object of the present invention to provide improved methods of conducting seismic exploration utilizing a linear explosive material as the seismic wave source.

It is a further object of this invention to provide a method of inserting a linear explosive material into a seismic shot hole in a compressed state occupying a minimum of space and expanding the compressed material in the shot hole to the desired configuration.

It is an additional object of the present invention to provide methods of packaging a linear explosive material for insertion into a shot hole occupying a minimum volume.

It is an additional object of this invention to provide methods of conducting seismic exploration utilizing lengths of linear explosive material in which the length of explosive material is inserted in a shot hole in a compressed form and then expanded into approximately helical form with a predeterminable pitch between turns of the material.

Objects and advantages other than those set forth above will be readily apparent from the following description when read in conjunction with the accompanying drawings, in which:

Fig. 1 is a side cross-sectional view of one method of packaging a linear explosive material in accordance with this invention.

Fig. 2 is a cross-sectional view taken along plane II—II of Fig. 1.

Fig. 3 diagrammatically illustrates the package of Fig. 1 with the linear explosive material expanded in the shot hole.

Fig. 4 illustrates an alternate embodiment of the invention utilizing a resilient member coupled to the explosive material.

Figure 5:
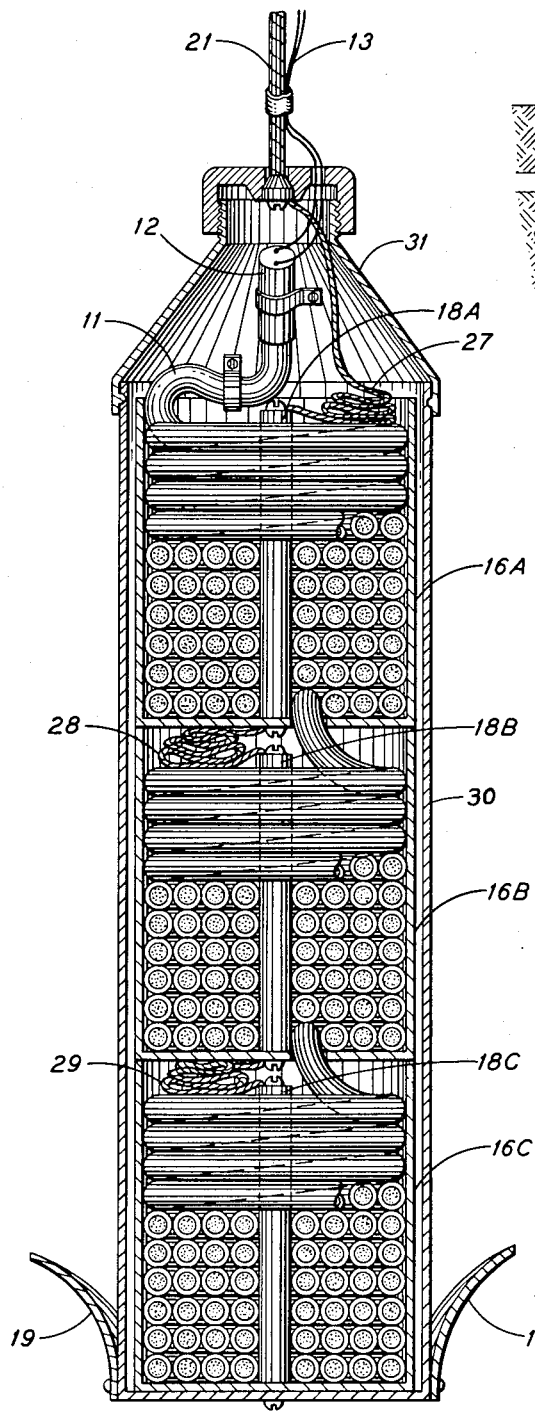

Fig. 5 is a side cross-sectional view of an alternate embodiment of the present invention utilizing a series of interconnected packages of linear explosive material packaged in accordance with the method of this invention.

Figures 6, 7:
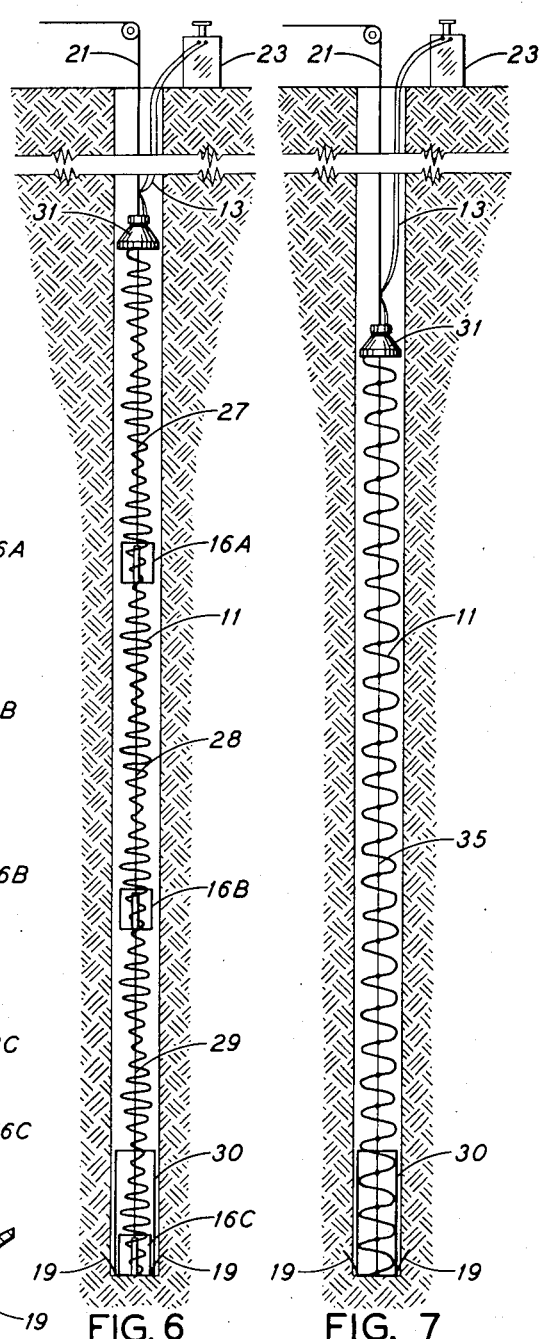

Fig. 6 diagrammatically illustrates the packages of Fig. 5 in the shot hole with the linear explosive material expanded or extended.

Fig. 7 illustrates an additional alternate embodiment of the present invention utilizing lengths of spacer cord secured to turns of the linear explosive material to determine the pitch of the helix resulting from expansion of the explosive material.

Referring to Fig. 1 by character of reference, numeral 11 designates a length of explosive material of the "Primacord" type, which is in the form of a flexible tube containing an explosive of such type that it detonates along the length of material 11 at a very rapid rate. One end of the material 11 has secured thereto a blasting cap or device 12 which is provided with blasting lead wires 13. Explosive material 11 is disposed in a container or canister 16 having a detachable cover portion 17 and preferably provided with a center spacing member, or core, 18.

Canister 16 is also preferably provided with anchors 19 for engaging the walls of a shot hole to rigidly secure the canister assembly in the shot hole, as will be more fully explained hereinbelow.

As shown in Figs. 1 and 2, explosive material 11 is wound in canister 16 in the form of a series of flat, stacked spirals produced by winding the material about center member 18 to form the successive spirals. Thus, the continuous length of explosive material 11 is compressed into a space occupying a minimum volume so that the package may be readily inserted into the shot hole.

In utilizing the package shown in Figs. 1 and 2, the package is lowered the desired distance into the well bore by a rope or wire 21 secured to cap 17. A slight pull upward on wire 21 then lodges anchors 19 into the sides of the shot hole to position canister 16 at the desired depth. Additional tension on wire 21 removes cover 17 and, as wire 21 is drawn up, the explosive material 11 is expanded from the canister and assumes a configuration shown in Fig. 3. As will be seen, the configuration is approximately helical, with the pitch between the turns of the helix being determined by the extent to which cover 17 or the upper end of material 11 is raised. Assuming that material 11 has a substantial amount of normal resilience, the material will be expanded into the substantially helical form shown in Fig. 3 with substantially the same length of explosive material in each turn, so that the material has a substantially uniform detonation velocity per unit of axial length. The explosive material may then be detonated by a blasting device 23 connected to blasting cap 12 through wires 13.

If the natural resilience of explosive material 11 is not sufficient to cause the material to expand into a substantially uniform helix, the alternate embodiment illustrated in Fig. 4 may be utilized. In this figure, material 11 is provided with a counter member 24 of a resilient material, such as spring steel. Member 24 may be either inserted into material 11 during its manufacture or may, as shown in Fig. 4, be secured to the outside of material 11 by strips of tape or other suitable binding material 25. The combined explosive material 11 and resilient member 24 may then be coiled in a manner similar to that shown in Figs. 1 and 2 for insertion into the shot hole. On expansion of the package, the resilience of spring member 24 causes the explosive material 11 to assume a substantially uniformly helical shape.

If a considerable amount of explosive is required for a single charge, it may be undesirable from a flexibility standpoint to make a single package containing the desired length of explosive. In such a case, the embodiment illustrated in Fig. 5 may be utilized, in which a series of individual packages is interconnected to provide the required length of explosive material. Separate canisters 16A, 16B and 16C are provided, and a continuous length of explosive material 11 is successively wound into flat, stacked spirals in each of the canisters. Thus, the single length of explosive material 11 starts at the lower end of canister 16C and is wound in flat, stacked spirals in canister 16C, thence through an opening in the bottom of canister 16B to fill canister 16B, and thence into canister 16A. The upper end of material 11 at the top of canister 16A is secured, as before, to blasting cap 12 which is connected by wires 13 to blaster 23.

Canisters 16A, 16B and 16C are interconnected by lengths of spacer cord, whose lengths determine the extent to which the canisters are separated upon expansion. A length of spacer cord 27 is provided between wire 21 and canister 16A to control the expansion of the portion of material 11 in canister 16A. One end of cord 27 is connected to wire 21 and the other end of cord 27 is connected to core 18A of canister 16A. A similar length of spacer cord 28 is provided between canister 16A and 16B, with one end of the cord secured to the lower end of canister 16A and the other end of cord 27 secured to core 18B of canister 16B. A spacer cord 29 is provided with one end secured to the lower end of canister 16B and the other end secured to core member 18C of canister 16C. The extra turns of cords 27, 28 and 29 are coiled on the top coils of material 11 in the respective canisters. The entire assembly may be inserted in a large canister 30 having a detachable cover member 31 secured to wire 21.

In operation, the entire assembly is lowered to the desired depth in the shot hole and a pull applied to wire 21 to firmly lodge anchor 19 to the side of the shot hole. Additional pull on wire 21 causes the material 11 in canisters 16A, 16B and 16C to uncoil and also causes spacer cords 27, 28 and 29 to expand. As shown in Fig. 6, the length of expansion of material 11 between canisters 16A, 16B and 16C is determined by the lengths of the respective spacer cords 27, 28 and 29, so that the effective pitch of the helically wound turns of explosive material 11 is determined by the lengths of the spacer cords.

Fig. 7 illustrates an additional alternate embodiment of the present invention in which lengths of spacer cord are used between turns of material 11 to more accurately control the pitch of the helix resulting from uncoiling of material 11. Material 11 is wound and coiled in a manner similar to that shown in Figs. 1 and 2, and certain turns of the resultant coils are tied together by lengths of spacer cord 35. Adjacent turns may be tied together, but, preferably, alternate turns are tied together as shown in Fig. 7. The package is lowered into the hole and, upon applying tension to wire 21, material 11 expands into a helix having a pitch between turns determined by the lengths of the spacer cords 35. Spacer cords 35 may be discrete lengths of cord individually tied between turns or may be a single length of cord secured to the desired number of turns.

Although but a few embodiments of the present invention have been illustrated and described, it will be apparent to those skilled in the art that various changes and modifications may be made therein without departing from the spirit of the invention. In particular, although it was assumed that an approximate helix was the desired form of the expanded explosive material, it is possible to produce other configurations. For example, the explosive material may be folded back and forth on each level of the canister, so that the expanded material assumes the form of a series of zig-zags. In this connection, care should be taken to prevent unduly sharp bends between adjacent turns of the expanded material to avoid detonation across the turns, rather than along the material.

I claim:

1. The method of creating a seismic disturbance in the earth comprising the steps of coiling a length of linear explosive material in a series of stacked spirals, inserting said coiled material into a shot hole, expanding said coiled material into approximately helical form with a predetermined pitch between turns of said material, and detonating said explosive material.

2. The method of creating a seismic disturbance in the earth comprising the steps of coiling a length of linear explosive material in a series of stacked spirals, inserting said coiled material into a shot hole, anchoring the lower end of said material at the desired depth in said hole, expanding said coiled material into approximately helical form with a predetermined pitch between turns of said material, and detonating said explosive material.

3. The method of creating a seismic disturbance in the earth comprising the steps of coiling a length of linear explosive material in a series of stacked spirals, inserting said coiled material into a shot hole, anchoring the lower end of said material at the desired depth in said hole, applying tension to the upper end of said material to expand said coiled material into substantially helical form with a predetermined pitch between turns of said material, and detonating said explosive material.

4. The method of producing a seismic disturbance in a shot hole comprising the steps of coiling a linear explosive material in a series of stacked spirals having an outside diameter less than the diameter of said hole, joining different turns of said coiled material together with spacer cords having a predetermined length, inserting said coiled material into said shot hole, anchoring the lower end of said coiled material, expanding said spiral a predetermined distance as determined by the length of said spacer cords, and detonating said explosive material.

5. The method of producing a seismic disturbance in a shot hole comprising the steps of coiling a linear explosive material in a series of stacked spirals having outside diameters less than the diameter of said hole, joining different turns of said coiled material together with spacer cords having a predetermined length, inserting said material into said shot hole, anchoring the lower end of said material at the desired depth in said hole, expanding said coiled material into substantially helical form with a pitch between turns determined by the length of said spacer cords, and detonating said explosive material.

6. The method of producing a seismic disturbance in a shot hole comprising the steps of coiling a linear explosive material in a series of stacked spirals having an outside diameter less than the diameter of said hole, joining adjacent turns of said coiled material together with spacer cords having a predetermined length, inserting said coiled material into said shot hole, anchoring the lower end of said material at the desired depth in said hole, expanding said coiled material a predetermined distance as determined by the length of said spacer cords, and detonating said explosive material.

7. The method of producing a seismic disturbance in a shot hole comprising the steps of coiling a linear explosive material in a series of stacked spirals having an outside diameter less than the diameter of said hole, joining alternate turns of said coiled material together with spacer cords having a predetermined length, inserting said coiled material into said shot hole, anchoring the lower end of said material at the desired depth in said hole, expanding said coiled material a predetermined distance as determined by the length of said spacer cords, and detonating said explosive material.

8. The method of creating a seismic disturbance in the earth comprising the steps of securing a length of resilient material to a length of linear explosive material, coiling said resilient material and said explosive material in a series of stacked spirals, inserting said coiled materials into a shot hole, expanding said coiled materials a predetermined distance, and detonating said explosive material.

9. The method of creating a seismic disturbance in the earth comprising the steps of securing a length of resilient material to a length of linear explosive material, coiling said resilient material and said explosive material in a series of stacked spirals, inserting said coiled materials into a shot hole, expanding said coiled materials into substantially helical form, and detonating said explosive material.

10. The method of creating a seismic disturbance in the earth comprising the steps of securing a length of resilient material at spaced-apart points to a length of linear explosive material, coiling said resilient material and said explosive material in a series of stacked spirals, inserting said coiled materials into a shot hole, expanding said coiled materials into substantially helical form, and detonating said explosive material.

11. The method of producing a seismic disturbance in the earth comprising the steps of coiling a length of linear explosive material in a series of stacked spirals in each of a plurality of containers, interconnecting said containers with spacer cords of predetermined lengths, inserting said containers in a shot hole with said containers adjacent each other, separating said containers in said shot hole to expand said coiled material in said containers an amount determined by the lengths of said spacer cords, and detonating said expanded explosive material.

12. The method of producing a seismic disturbance in the earth comprising the steps of coiling a length of linear explosive material in a series of stacked spirals in each of a plurality of containers, interconnecting said containers with spacer cords of predetermined lengths, inserting said containers in a shot hole with said containers adjacent each other, separating said containers in said shot hole to expand said coiled material in said containers into substantially helical form with a pitch between turns determined by the lengths of said spacer cords, and detonating said expanded explosive material.

References Cited in the file of this patent

UNITED STATES PATENTS

| 2,414,349 | Alexander | Jan. 14, 1947 |
| 2,609,885 | Silverman | Sept. 9, 1952 |